Jan. 11, 1955

H. C. PEDERSEN 2,699,024

ROOT HARVESTER

Filed April 1, 1952

INVENTOR
HANS CHRISTIAN PEDERSEN,

BY Aksel M. Pedersen
ATTORNEY

Jan. 11, 1955 H. C. PEDERSEN 2,699,024
ROOT HARVESTER
Filed April 1, 1952 2 Sheets-Sheet 2
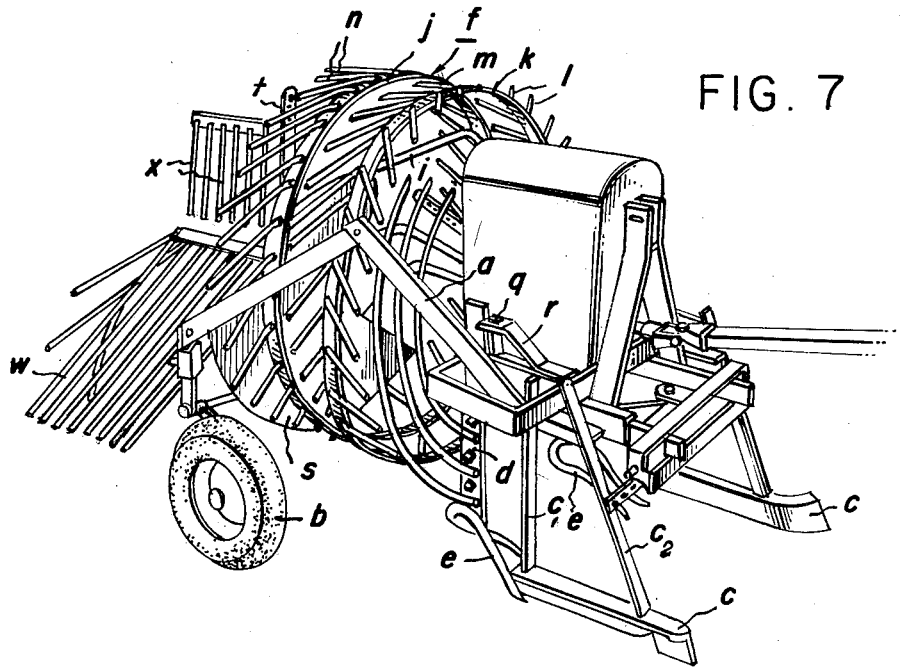
FIG. 7
FIG. 4
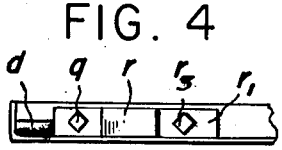
FIG. 5 FIG. 6 FIG. 2
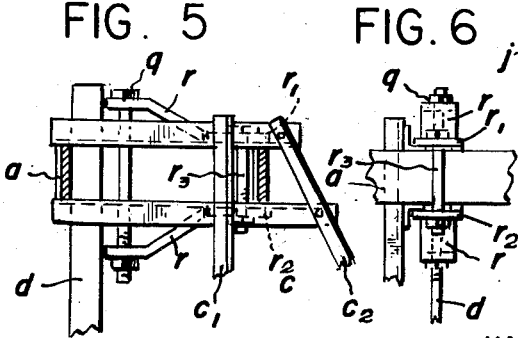 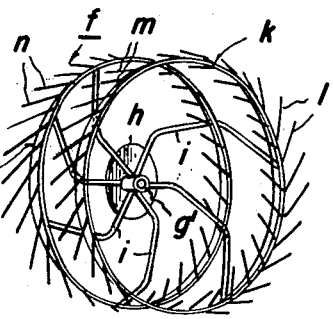
INVENTOR
HANS CHRISTIAN PEDERSEN,
BY *Aksel M. Pedersen*
ATTORNEY

United States Patent Office 2,699,024
Patented Jan. 11, 1955

2,699,024

ROOT HARVESTER

Hans Christian Pedersen, Vester-Skerninge, Denmark

Application April 1, 1952, Serial No. 279,885

6 Claims. (Cl. 55—56)

The present invention relates to a machine for plowing up beetroots, potatoes and other tubers, or onions or the bulbs of other liliaceous plants, and more particularly to a machine which pulls out or digs several rows of topped roots at a time, cleaning the same from earth and loose leaves, by means of a rotative cleaning and transport mechanism, and depositing the same in a single line or row on the ground.

Many forms of root-digging mechanisms have heretofore been devised and used, but these mechanisms are not substantially automatic in operation and require continuous adjustment of parts thereof during operation. Furthermore, the mechanisms, heretofore used, serve to plow up beetroots, tubers and the like but without depositing the roots in a straight line and without cleaning the same and separating earth and loose leaves therefrom. Consequently, it requires a substantial amount of hand labor to fully clean the beetroots or tubers after they have been plowed up from the ground.

The present invention, briefly described, comprises a machine adapted to travel on wheels and to plow up beetroots or other roots by means of a lifter iron or plow which is adjustable within a substantial range to provide for the desired depth of operation of the lifter element below the ground. A rotatable drum element in the machine serves to receive the beetroots or root material as it is raised by means of the plow and to tumble the same during the rotation of the drum so as to separate out earth and loose leaves. The drum element is rotated on a shaft by means of a motor, or by means of gears or suitable transmission from a tractor by which the machine may be drawn. The drum of the cleaning and transporting mechanism is mounted so as to rotate in a plane transverse to the driving direction of the machine and preferably comprises two rings which are mounted in parallel on an axle carried by the main frame of the machine so as to clear the ground over which the machine passes.

Mounted on the forward ring of the drum are rods which are inclined outwardly in the direction of rotation of the drum and serve to pick up the roots as they are raised by the lifter iron and pass them into the drum.

The main frame of the machine, which carries suitable bearings for the driving axle of the machine, together with gears for operating the drum, is carried at the rear by the supporting wheels for the machine and is supported at the front of the machine on steering tracks or runners having the forward ends thereof bent outwardly. To the rear of the steering tracks are digging irons or plows which are supported so as to be vertically adjustable.

In operation, the beetroots, or roots which are plowed up, are caught by the forwardly inclined rods which are attached to the forward ring of the cleaning drum and are transported by other various inclined rods through the drum of the machine. By this passage of the roots through the drum, the beetroots or other roots which are unearthed from the soil by the lifter irons are cleaned of earth and are freed from any accompanying leaves by the action of rotation of the drum, and after being lifted above the level of the drum shaft, the roots fall rearwardly over a cover plate located in a vertical plane to the rear of the frame portion and are carried onto a grate, which is mounted so that it may be inclined in a number of inclined positions transversely to the direction of movement of the machine. The said grate is mounted so as to be turned on a pivot located on the main frame of the machine and is preferably constructed so as to be adjustable at two different inclinations and to collect the beetroots passed through the drum of the machine and to deposit them in a single row or line on the ground.

The main frame of the machine forms an upward bend in a vertical plane at the side of the machine where the collecting drum turns upward, so as to give ample space for the passage of the leaves which are sorted out by the drum from the accompanying roots and discarded.

If the grate is adjusted so that the lower end is turned inward toward the central part of the machine, the grate will gather the beetroots or roots which are dug up from the two first gathered rows into a single line or row at the middle of the machine. If, on the other hand, the grate is turned so that its lowermost end turns outwardly toward the side of the machine, and the machine is driven out around the first two dug or collected rows, the grate will lay two rows up to the first row from each side, whereby roots are collected from six rows of the roots and deposited in a single line or row.

Mounted on a vertical shaft or rail extending from the rear part of the main frame of the machine is a shorter grate which is positioned in a substantially vertical position and prevents the beetroots, or roots collected, from falling outside of the main grate which is adapted to be set in two inclined positions.

On the side of the vertical rail or shaft facing the drive shaft of the machine, the rail carries curved pins or rails which are mounted on the said vertical shaft or rail concentrically with the driving shaft, the pins or rails closing the upper part of the rear end of the cleaning and transport wheel.

The main frame of the machine may be provided at the rear portion thereof with a bar extending downwardly toward the ground, the bar being bifurcated at the bottom thereof, thus preventing the beetroots or roots plowed up from being spread when they slide down the grate.

The shafts or bars holding the lifter irons or plows which are located behind the two guide-rail-shaped runners extend through two-forked locking pieces which are fastened around the main frame of the machine by means of a stretching or expansion screw, which locking pieces abut, at a suitable distance above each other, with their ends against the front edge of the shafts or bars holding the lifter irons and keep the same rigidly in a vertical position and serve also to secure the runners in position which serve as guiding rails.

The locking pieces permit a lateral displacement and adjusting of the lifter irons or plows and also of the guiding rails for different distances between the rows of the beetroots or roots to be plowed up.

Referring to the accompanying drawings, showing the invention in its preferred form:

Fig. 2 is a view in perspective on a reduced scale, illustrating the collecting, cleaning and transport wheel of the said machine;

Fig. 4 is an enlarged detailed fragmentary plan view showing one of the locking pieces in secured position;

Fig. 5 is an enlarged detailed fragmentary view in elevation showing the locking pieces and securing means therefor;

Fig. 6 is an enlarged fragmentary side view from the right in Fig. 5, and

Fig. 7 is a view in perspective of the machine of the invention corresponding substantially to Fig. 1 and showing the change gears and associated moving parts covered by a hood.

Figure 1:
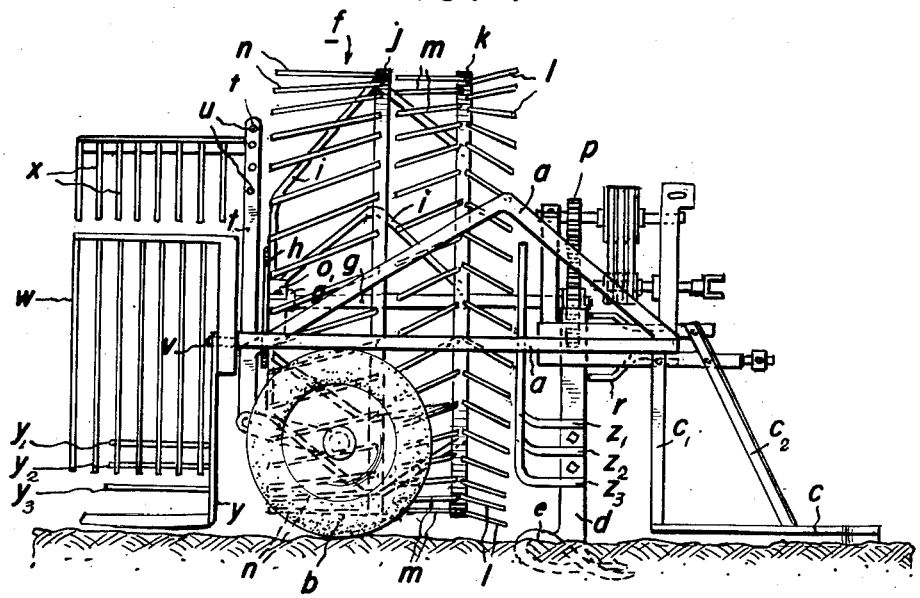
Fig. 1 is a schematic view in side elevation of the machine of the invention.

Referring more in detail to the drawings, the letter $a$ designates the main frame of the machine, which is supported rearwardly by wheels $b$, and at the front portion thereof by steering tracks or guide rails $c$, which are securely held in position by vertical stays $c_1$, and inclined stays $c_2$, which are fastened to the front end of the main frame $a$. To the rear of the steering tracks or guide rails $c$, the main frame $a$ carries special locking means $r$ for locking the lifter rods $d$, which carry the lifter irons or plows $e$, in secured position. A cleaning and transporting drum member $f$ for the lifted roots is carried by a shaft member $g$, which is centrally journalled in the main frame $a$ of the machine. The shaft $g$ rotates transversely to the direction of movement of the machine and is driven from the supporting wheels $b$ by a special motor or by a suitable transmission from a tractor to which the machine is attached. A back plate $h$ mounted on a hub $g_1$ at the rear of the shaft is preferably circular and carries bars or rods $i$ which extend upwardly first and are then bent forwardly in the direction of rotation of the back plate member. The bars or rods $i$ carry two rings, $j$ and $k$, which are mounted in planes parallel to the plane of the back plate $h$, which rings have substantially equal diameters, as one meter, for example, so that they reach nearly to the ground in the movement of the machine. The bars or rods $i$ first extend radially from the hub, and are then bent forwardly in angles of about 45° to the ring $j$, and from the ring $j$ at angles of about 45° to the ring $k$.

From the front edge of the ring $k$ are forwardly extending bars $l$, which are preferably inclined toward the direction of rotation of the ring $k$, and are bent slightly outwardly, in relation to the ring so that their outermost ends or peripheries lie in a circle which is a little larger than that of the ring $k$. The bars $m$ extend rearwardly from the ring $k$ toward the ring $j$, so as to substantially close the space between the rings $j$ and $k$. From the rear edge of the ring $j$, bars $n$ extend rearwardly and are inclined in relation to the direction of rotation of the ring and extend substantially to the plane of the rear plate $h$, as shown in Figs. 2 and 7 of the drawings.

The main frame $a$ of the machine, which is provided with suitable bearings $o$ for the drive shaft $g$, and change gears $p$, carries the root-lifter rods $d$, which by means of special locking pieces $r$ (Figs. 5 and 6) are held firmly in position adjacent the main frame $a$, by a stretching screw or bolt member $q$. The front ends of the locking pieces $r$ abut plate members $r_1$ and $r_2$, which are preferably bolted into fixed position by means of a bolt member $r_3$, so that as the bolt member $q$ is tightened, the rear ends of the locking pieces contact more tightly with the rod $d$, holding it firmly in adjusted position. Simultaneously, the locking pieces $r$ secure the positions of the vertical and inclined supporting bars $c_1$ and $c_2$ to the guide rails at the front end of the machine.

The main frame $a$ forms an upward bend at the side of the machine where the collecting, cleaning and transport wheel, formed by the rings $j$ and $k$ and the bars $n$, $m$ and $l$, turns upward, which upward bend lies in a vertical plane as indicated in Fig. 1 of the drawings, thus forming a passage for the loose top leaves following the beetroots or roots, which leaves fall out of the wheel in its forward direction and down at the side of the machine under the said upward bend of the main frame $a$.

Figure 3:
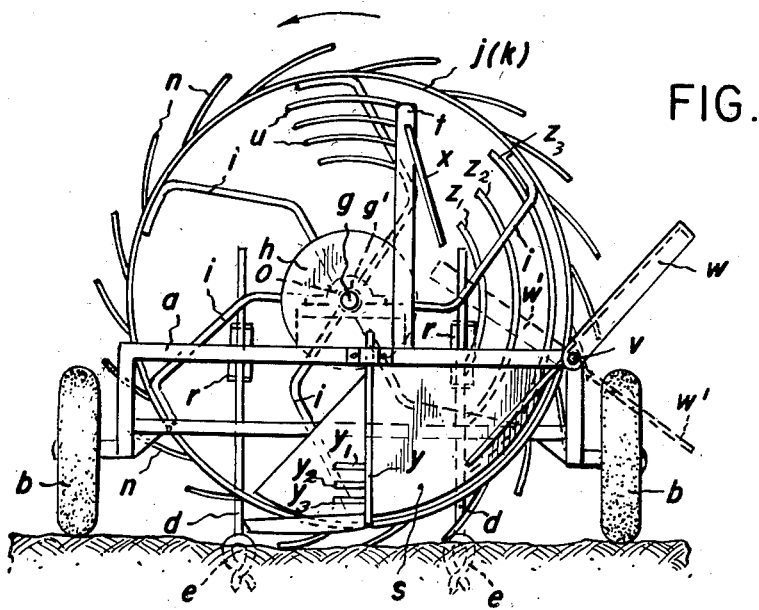
Fig. 3 is a rear view in elevation illustrating more or less diagrammatically the machine showing the main grate in inclined position and illustrating in dotted line position the position of the grate in another setting thereof.

At the rear of the machine, at the same side of the main frame, it carries a cover plate $s$, as shown more particularly in Fig. 3 of the drawings, the cover plate having the shape of the collecting wheel and covers the lower part thereof up to the level of the shaft $g$ at the right side, as shown in Fig. 3, and carries a vertical rod or bar $t$, which at the top carries arms or bars $u$ which are concentric with the wheel or shaft $g$ and lie in a plane parallel to that of the ring $j$.

At the rear end of the main frame $a$, at the right hand side thereon as shown in Fig. 3 of the drawings is a pivot $v$ on which is mounted a grate $w$, as shown in Figs. 1 and 3, which is movable in a vertical plane into two separate inclined positions. This grate $w$, which is disposed transversely to the movement of the machine, collects beetroots or roots from up to six rows of roots, which in passing through the machine are separated from leaves and earth and fall cleaned over the cover plate $s$ from the drum-wheel during its rotation, depending on the manner in which the machine is driven in relation to the rows of beetroots or roots which are lifted, and depending also on the set of the grate $w$ in inclined position toward the middle of the machine or outwardly to the side of the machine as indicated in dotted lines in Fig. 3 of the drawings, as designated by $w'$.

On the vertical rod or bar $t$ is mounted a substantially vertical grate $x$ which is preferably suspended from near the top of the bar $t$ and serves to prevent the roots, when lifted up over the level of the shaft $g$ in the rotation of the drum wheel, from falling outside of the grate $w$.

On the outer side (toward the right in Fig. 1) of the lifter shaft $d$ are fastened arms or bars $z_1$, $z_2$ and $z_3$ positioned in a plane parallel to the front end of the drum and are bent concentrically with the same, as indicated more particularly in Fig. 3 of the drawings, which arms $z$ cover the lower right hand part of the drum opening and prevent the roots which are lifted by the lifter irons or plows into the drum from falling out before they are lifted by the inclined bars $l$, $m$ and $n$ and carried backward through the drum and out of the same.

At the back of the main frame $a$ of the machine is a vertically extending rod $y$ having laterally projecting forks or arms $y_1$, $y_2$ and $y_3$, which prevent the roots from being spread laterally, or to one side, when they slide down the grate $w$, when the grate is set so that it is inclined inwardly toward the middle of the machine. When the grate is set in this position, the machine will collect the roots from the two first lifted rows into a single line directly behind the machine. When, thereafter, the grate is turned so that its bottom end projects out to the side of the root lifter or plow, as indicated in dotted lines in Fig. 3, so that the two first collected rows are by-passed, the grate will place two rows up to the first from either side thereof, in which manner roots from six rows in all are collected into a single line.

It is to be understood that the invention has been shown and described in its preferred form, and that various changes or modifications may be made, as will be apparent to those skilled in the art without departing from the spirit or scope of the invention as defined in the claims annexed hereto.

I claim:

1. A root harvester comprising a framework adapted to be moved lengthwise along the ground for use with a plow or the like for elevating roots growing in a row, a rotatable horizontal skeletonized drum mounted on the framework with its axis extending lengthwise thereof for receiving roots at its front end and delivering them from its rear end as the framework is moved along the ground and the drum is rotated, and a grate mounted adjacent the rear end of the drum for receiving roots delivered by the drum, said drum including a multiplicity of peripheral openings for discharging earth, leaves and the like freed from the moving roots, and said grate being pivoted on the framework for movement to alternative terminal positions adapted to deposit said roots directly behind the framework or off to a side thereof.

2. A root harvester as claimed in claim 1, in which the grate comprises an assembly of parallel rods mounted in a flat plane pivoted substantially centrally of the assembly adjacent the periphery of the drum for setting alternatively substantially tangentially or radially of the drum.

3. A root harvester as claimed in claim 1, in which the drum comprises a ring having a plurality of bars projecting rearwardly in the plane of the periphery of the drum, said bars having their rear ends unconnected and providing endwise open spaces between adjacent bars through which spaces roots may fall onto said grate.

4. A root harvester as claimed in claim 1, in which the drum comprises ring means having a set of bars projecting rearwardly in the plane of the periphery of the drum and a set of bars projecting forwardly in the plane of the periphery of the drum, the bars of each set having their projecting ends unconnected and providing endwise open spaces between adjacent bars, whereby roots may be caught between forwardly projecting bars and may be dropped between rearwardly projecting bars onto said grate.

5. A root harvester comprising a framework adapted to be moved along the ground for use with a plow or the like for elevating growing roots, a skeletonized drum supported in the framework for rotation about a horizontal axis parallel to the direction of movement of the framework, said drum comprising peripheral ring means and a plurality of bars projecting forwardly from said ring means and having their forward ends unconnected and providing endwise open spaces between adjacent bars for receiving roots at the forward end of the drum.

6. A root harvester comprising a framework adapted to be moved along the ground for use with a plow or the like for elevating growing roots, a skeletonized drum supported in the framework for rotation about a horizontal axis parallel to the direction of movement of the framework, said drum comprising peripheral ring means and a set of bars projecting rearwardly in the peripheral plane of the drum and a set of bars projecting forwardly in the peripheral plane of the drum, the bars of each set having their projecting ends unconnected and providing endwise open spaces between adjacent bars whereby roots delivered to the front end of the drum may be caught between the bars of the forwardly projecting set and may be dropped between the bars of the rearwardly projecting set for discharge after being freed of earth and the like in movement through the drum.

References Cited in the file of this patent

UNITED STATES PATENTS

| Number | Name | Date |
|---|---|---|
| 1,086,563 | Ruka, Jr. | Feb. 10, 1914 |
| 1,169,288 | Sexton | Jan. 25, 1916 |
| 1,895,157 | Gailus | Jan. 24, 1933 |
| 2,007,161 | Gailus | July 9, 1935 |
| 2,018,575 | Robinson | Oct. 22, 1935 |